(12) United States Patent
Routh et al.

(10) Patent No.: US 11,476,931 B1
(45) Date of Patent: Oct. 18, 2022

(54) ELECTROMAGNETIC (EM) CHANNEL EMULATOR SYSTEM

(71) Applicant: Rockwell Collins, Inc., Cedar Rapids, IA (US)

(72) Inventors: Christopher Routh, Marion, IA (US); Jonathan A. Lovseth, Marion, IA (US); Robert McCabe, Swisher, IA (US); Sasha Oster, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/246,242

(22) Filed: Apr. 30, 2021

(51) Int. Cl.
*H04B 10/07* (2013.01)
*H04B 1/72* (2006.01)
*H04B 10/073* (2013.01)
*H04Q 11/00* (2006.01)

(52) U.S. Cl.
CPC ....... *H04B 10/073* (2013.01); *H04Q 11/0005* (2013.01); *H04Q 2011/0058* (2013.01); *H04Q 2213/13335* (2013.01)

(58) Field of Classification Search
CPC .................................. H04B 10/07; H04B 1/72
See application file for complete search history.

(56) References Cited

U.S. PATENT DOCUMENTS

| | | |
|---|---|---|
| 8,352,223 B1 | 1/2013 | Anthony et al. |
| 8,843,077 B2 | 9/2014 | Haran |
| 10,922,500 B2 | 2/2021 | Horchak et al. |
| 2009/0028270 A1 | 1/2009 | Chen |
| 2020/0363503 A1* | 11/2020 | Salvesen ................. G01S 7/285 |
| 2021/0028868 A1 | 1/2021 | Foegelle |

FOREIGN PATENT DOCUMENTS

CN    104980230 B    6/2019

* cited by examiner

*Primary Examiner* — Shi K Li
(74) *Attorney, Agent, or Firm* — Suiter Swantz pc llo

(57) ABSTRACT

An electromagnetic channel emulator system is disclosed. The system includes an electromagnetic switch matrix subsystem communicatively coupled to one or more systems under test and one or more simulation control layers. The system may include a high performance computing layer including one or more processing element nodes. The electromagnetic switch matrix sub-system may include one or more electromagnetic systems under test input/output layers and one or more high performance computing input/output layers. The one or more input/output layers may include one or more signal converters. The electromagnetic switch matrix sub-system may include one or more switches communicatively coupled to the one or more input/output layers and the high performance computing layer. The one or more switches may be configured to selectively position the one or more analog signals based on the received one or more simulation control layer signals.

13 Claims, 14 Drawing Sheets

ELECTROMAGNETIC (EM) CHANNEL EMULATOR SYSTEM

BACKGROUND

Current simulated environments rely on conventional digital computing that is incapable of providing the processing, memory storage, or transfer speed required to accurately emulate a real-world electromagnetic (EM) environment and EM signal interactions through a simulated space in real-time.

SUMMARY

A system is disclosed, in accordance with one or more embodiments of the present disclosure. In one embodiment, the system includes one or more electromagnetic systems under test. In another embodiment, the system includes one or more simulation control layers, the one or more simulation control layers configured to perform one or more simulations of the one or more electromagnetic systems under test within an emulated electromagnetic environment, the one or more simulation control layers configured to generate one or more simulation control layer signals based on the performed one or more simulations. In another embodiment, the system includes an electromagnetic channel emulator sub-system. In another embodiment, the electromagnetic channel emulator sub-system includes an electromagnetic switch matrix sub-system, the electromagnetic switch matrix sub-system communicatively coupled to the one or more electromagnetic systems under test and the one or more simulation control layers, the electromagnetic switch matrix sub-system configured to receive the one or more simulation control layer signals from the one or more simulation control layers. In another embodiment, the electromagnetic channel emulator sub-system includes a high performance computing layer including one or more processing element nodes, the high performance computing layer communicatively coupled to the electromagnetic switch matrix sub-system and the one or more simulation control layers, the high performance computing layer configured to receive the one or more simulation control layer control signals from the one or more simulation control layers. In another embodiment, the electromagnetic switch matrix sub-system includes one or more input/output layers, the one or more input/output layers including one or more electromagnetic systems under test input/output layers and one or more high performance computing input/output layers, the one or more input/output layers including one or more signal converters configured to convert one of one or more analog electromagnetic signals into one or more converted optical analog signals or one or more optical analog signals into one or more converted analog electromagnetic signals. In another embodiment, the electromagnetic switch matrix sub-system includes one or more switches, the one or more switches communicatively coupled to the one or more input/output layers and the high performance computing layer, the one or more switches configured to selectively position a path of an analog electromagnetic signal of the one or more analog electromagnetic signals based on the received one or more simulation control layer signals, the path of the analog electromagnetic signal of the one or more analog electromagnetic signals including one of an inboard path to a processing element node or an outboard path from a processing element node.

In some embodiments, the electromagnetic switch matrix sub-system may further comprise a backbone layer, the backbone layer including one or more backbone nodes, the one or more backbone nodes comprising: one or more multiplexing and demultiplexing mechanisms; and one or more backbone layer switches, the one or more multiplexing and demultiplexing mechanisms configured to package the one or more analog optical signals into a single packaged signal carrier and provide the single packaged signal carrier to the one or more backbone switches, the one or more multiplexing and demultiplexing mechanisms configured to unpackage the single packaged signal carrier and provide the unpackaged signal carrier to the one or more switches of the electromagnetic switch matrix sub-system.

In some embodiments, the one or more switches may include a first set of one or more switches positioned between the one or more electromagnetic systems under test input/output layers and the backbone layer and an additional set of one or more switches positioned between the backbone layer and the one or more high performance computing input/output layers.

In some embodiments, the one or more simulation control layers may be configured to cause the one or more switches to selectively position the one or more analog optical signals within the backbone layer based on the received one or more simulation control layer signals.

In some embodiments, the one or more switches may be positioned between the one or more electromagnetic systems under test input/output layers and the one or more high performance computing input/output layers.

In some embodiments, the one or more simulation control layers may be configured to cause the one or more switches to selectively position the one or more analog electromagnetic signals within a processing element node of the one or more processing element nodes of the high performance computing input/output layer based on the received one or more simulation control layer signals.

In some embodiments, the one or more electromagnetic systems under test may include a first electromagnetic system under test and a second electromagnetic system under test, the first electromagnetic system under test being on a first processing element and the second electromagnetic system under test being on a second processing element, the first processing element being different than the second processing element, the one or more electromagnetic systems under test configured to move closer together to cause the one or more simulation control layers to generate one or more simulation control layer signals to cause the one or more switches to move the first electromagnetic system under test and the second electromagnetic system under test onto the same processing element.

In some embodiments, the one or more simulation control layers may be configured to generate one or more simulation control signals to cause the one or more switches to co-locate the one or more electromagnetic systems under test by moving a first electromagnetic system under test and a second electromagnetic system under test onto a first processing element and a third electromagnetic system under test onto a second processing element, the first processing element positioned adjacent to the second processing element.

In some embodiments, the one or more electromagnetic systems under test may include a first group of one or more electromagnetic systems under test and an additional group of one or more electromagnetic systems under test, the one or more electromagnetic systems under test of the first group positioned in close proximity to each other, the one or more electromagnetic systems under test of the additional group positioned in close proximity to each other, the one or more simulation control layers configured to generate one or more simulation control to cause the one or more switches to adjust the first group and the additional group by swapping a first system under test of the first group with a second system under test of the additional group.

In some embodiments, the one or more electromagnetic systems under test may be configured to one of transmit one or more signals or receive one or more signals, the one or more simulation control layers configured to generate one or more simulation control layer signals to cause the one or more switches to split one or more receive signals and one or more transmit signals by placing the one or more receive signals on a first backplane and by placing the one or more transmit signals on an additional backplane, the first backplane having a longer digital transfer than the additional backplane.

In some embodiments, the one or more electromagnetic systems under test may include a first set of one or more electromagnetic systems under test and an additional set of one or more electromagnetic systems under test, the first set of one or more electromagnetic systems under test having one or more first electromagnetic signal characteristics and the second set of one or more electromagnetic systems under test having one or more additional electromagnetic signal characteristics, the one or more first electromagnetic signal characteristics being different than the one or more additional electromagnetic signal characteristics, the one or more simulation control layers configured to generate one or more simulation control layer signals to cause the one or more switches to place the first set of one or more electromagnetic systems under test on a first backplane processing element and the additional set of one or more electromagnetic systems under test on an additional backplane processing element, the first set of one or more electromagnetic systems under test configured to not interact with the additional set of one or more electromagnetic systems under test.

An electromagnetic channel emulator system is disclosed, in accordance with one or more embodiments of the present disclosure. In one embodiment, the system includes an electromagnetic switch matrix sub-system, the electromagnetic switch matrix sub-system communicatively coupled to the one or more electromagnetic systems under test and the one or more simulation control layers, the electromagnetic switch matrix sub-system configured to receive the one or more simulation control layer signals from the one or more simulation control layers. In another embodiment, the system includes a high performance computing layer including one or more processing element nodes, the high performance computing layer communicatively coupled to the electromagnetic switch matrix sub-system and the one or more simulation control layers, the high performance computing layer configured to receive the one or more simulation control layer control signals from the one or more simulation control layers. In another embodiment, the electromagnetic switch matrix sub-system includes one or more input/output layers, the one or more input/output layers including one or more electromagnetic systems under test input/output layers and one or more high performance computing input/output layers, the one or more input/output layers including one or more signal converters configured to convert one of one or more analog electromagnetic signals into one or more converted optical analog signals or one or more optical analog signals into one or more converted analog electromagnetic signals. In another embodiment, the electromagnetic switch matrix sub-system includes one or more switches, the one or more switches communicatively coupled to the one or more input/output layers and the high performance computing layer, the one or more switches configured to selectively position a path of an analog electromagnetic signal of the one or more analog electromagnetic signals based on the received one or more simulation control layer signals, the path of the analog electromagnetic signal of the one or more analog electromagnetic signals including one of an inboard path to a processing element node or an outboard path from a processing element node.

In some embodiments, the electromagnetic switch matrix sub-system may further comprise a backbone layer, the backbone layer including one or more backbone nodes, the one or more backbone nodes comprising: one or more multiplexing and demultiplexing mechanisms; and one or more backbone layer switches, the one or more multiplexing and demultiplexing mechanisms configured to package the one or more analog optical signals into a single packaged signal carrier and provide the single packaged signal carrier to the one or more backbone switches, the one or more multiplexing and demultiplexing mechanisms configured to unpackage the single packaged signal carrier and provide the unpackaged signal carrier to the one or more switches of the electromagnetic switch matrix sub-system.

In some embodiments, the one or more switches may include a first set of one or more switches positioned between the one or more electromagnetic systems under test input/output layers and the backbone layer and an additional set of one or more switches positioned between the backbone layer and the one or more high performance computing input/output layers.

In some embodiments, the one or more switches may be positioned between the one or more electromagnetic systems under test input/output layers and the one or more high performance computing input/output layers.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
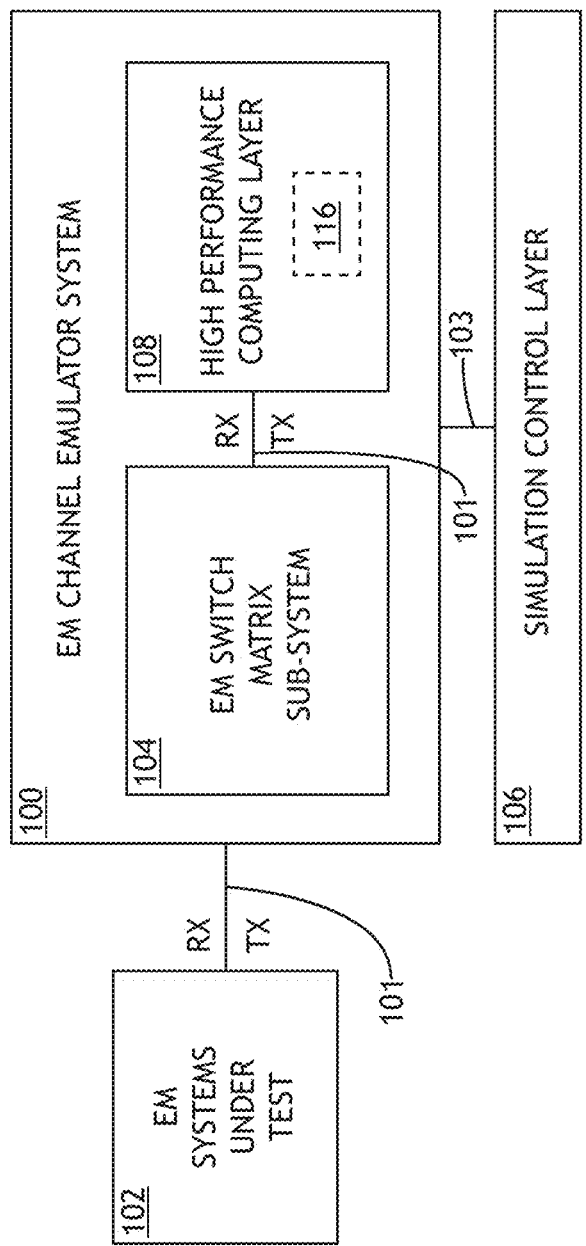
FIG. 1A illustrates a simplified block diagram of a system including an electromagnetic (EM) channel emulator system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Current simulated environments rely on conventional digital computing that is incapable of providing the processing, memory storage, or transfer speed required to accurately emulate a real-world EM environment and EM signal interactions through a simulated space in real-time.

A channel emulator models and emulates all connected EM devices' perception in terms of transmitted and received signals of the world in real-time acting as a virtual environment or "holodeck" for those systems. It is noted that EM Channel Emulators may include any type of EM channel emulator including, but not limited to, Radio Frequency (RF), Infrared (IR), Electro Optical (EO), and all other signals along the electromagnetic spectrum. Resources needed to hold, transfer, and copy the digital EM signal within the EM channel emulator to process its interactions with the environment and other system's signals limit scale of simulation able to be done using these systems at any cost level. To minimize these resources, test creators manually position their EM devices to minimize these transfers but due to changing simulation positions, orientations, number of systems, velocity, propagation paths the signal may take, or other complex system behavior the optimal placement is constantly changing. For example, the largest conventional EM channel emulator, supports approximately 128 EM Systems with approximately 80 MHz bandwidth and static scenarios with fixed cables carrying the analog signals which require manual adjusted for each scenario. Unable to meet the dynamic optimal placement of the input and output of the EM signals creates an exponential growth in digital traffic in the form of digital copies and transfers between processing elements limiting the complexity emulated environments possible.

However, scaling large Electromagnetic (EM) emulated worlds is necessary for advancing increasingly complex solutions (e.g., radar, electronic warfare, multifunction systems, communications, and the like) in complex environments (e.g., swarms, hypersonics, self-driving cars, and the like). As the number of systems under test (SUTs) increase, the digital signal data bitrate, processing, and memory needs increase. Therefore, there is a need for a system configured to allow for scalability of a maximum number of SUTs, while also reducing digitized signal data throughput requirements.

Broadly, embodiments of the present disclosure are directed to a EM emulator system including a EM switch matrix sub-system configured to scale EM channel emulation beyond the limitations of digital transference caused by sub-optimal analog signal ingress/egress. More particularly, embodiments of the present disclosure are directed to a EM emulator system including a EM switch matrix sub-system including one or more EM to optical converters and one or more optical switches to scale EM emulation by keeping an optimized distribution of incoming analog signals and control signals to processing elements (PEs) and outbound processed signals from PEs. In this regard, the EM switch matrix (EMSM) sub-system may be directed by a simulation control layer configured to co-locate, in real-time, analog EM signals according to their simulated geographic location, PE resource loading, or allocated equipment. For example, the EMSM sub-system may provide analog TX/RX signals and their control signals. By way of another example, the wide bandwidth of each optical fiber may include multiple RF signals for selective decoding at the PE. Optical splitters may be configured to allow the same signal to be sent/received at multiple PEs. The EMSM sub-system dynamically achieves optimal analog signal ingress and egress placement thereby reducing the digital signal transfer or duplication scaling issues.

FIG. 1A illustrates a simplified block diagram of the EM Channel Emulator system 100, in accordance with one or more embodiments of the disclosure.

The system 100 may be coupled to one or more EM Systems Under Test 102 (EM SUT). It is noted that the one or more SUTs 102 may include any EM SUT device known in the art. For example, the EM SUT device may include one or more EM SUT devices within various technological fields including, but not limited to, consumer, automotive, aerospace, defense, and the like. Further, it is noted that the EM channel emulator system 100 may pose benefits for various technological systems including, but not limited to, large phased arrays, space and terrestrial swarm systems, internet of things, cognitive RF, machine learning, directional systems, hypersonic systems, multifunctional RF/EM (MFRF) systems, or the like.

The system 100 may be coupled to one or more simulation control layers 106. For example, the simulation control layer 106 may be configured to run simulated scenarios and communicate the state of the virtual world 103 to the EM channel emulator system 100.

Figure 1B:
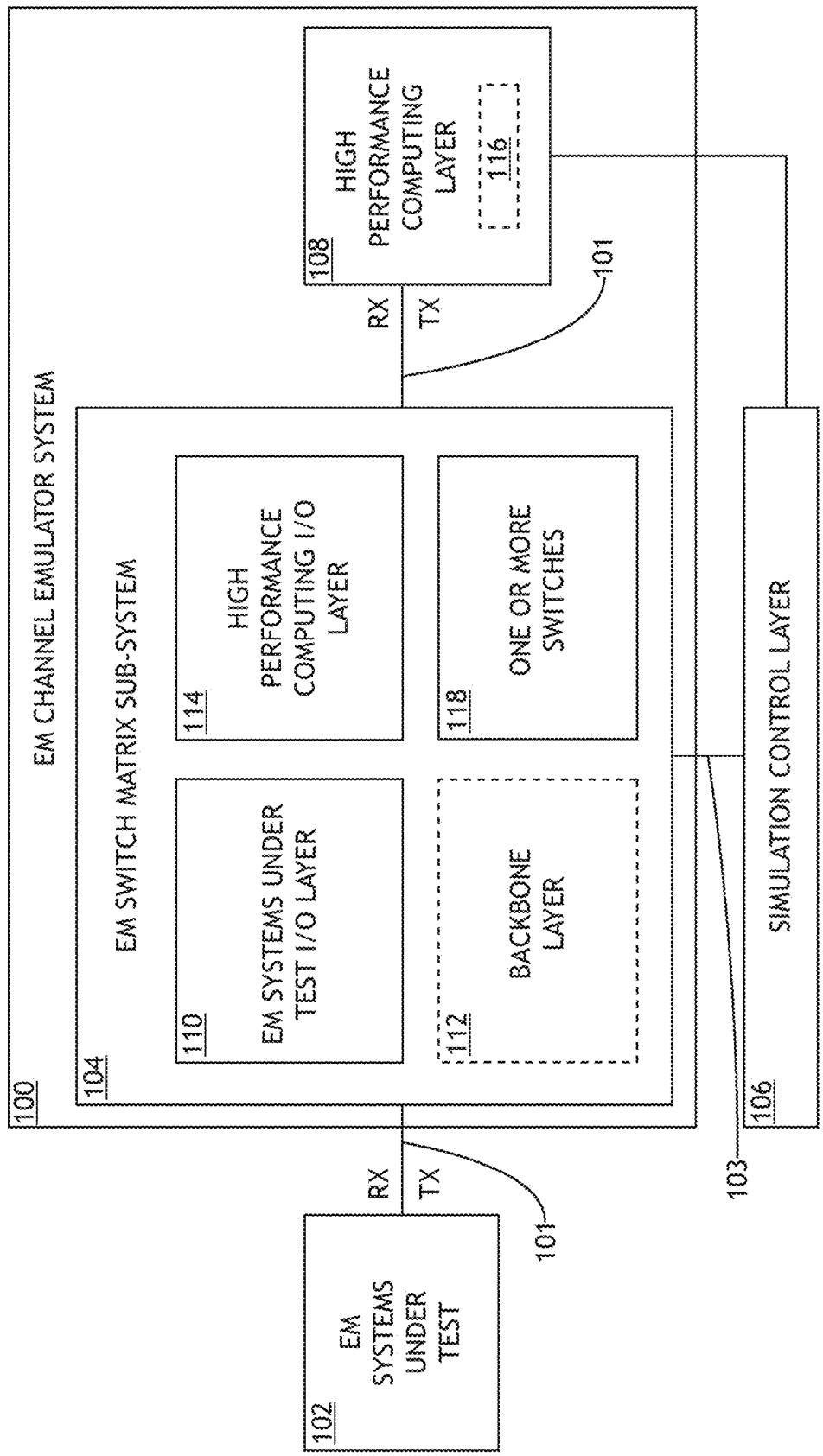
FIG. 1B illustrates a simplified block diagram of the system including the EM channel emulator system with an detailed EM switch matrix sub-system, in accordance with one or more embodiments of the disclosure.

FIG. 1B illustrates a simplified block diagram of the EM channel emulator system 100 including an EM switch matrix sub-system 104 (EMSM sub-system).

The one or more EM SUTs 102 may be coupled to the EMSM sub-system 104, where the signal 101 passes to successive input/output (I/O) layers 110, 114 and optional backbone layers 112, allowing analog signal placement and scaling along the analog transfer. The analog signal may be sampled into digital samples on processing elements (PEs) 116 within a high performance computing layer 108 (HPC layer) where the signal may be manipulated per the simulation, combined with other signals, and transferred within the PEs in the EM channel emulator system 100 to its intended egress.

The one or more EM SUTs 102 may be configured to receive one or more EM signals 101 from the EM channel emulator system 100. For example, the one or more SUTs 102 may receive one or more unique receiver (RX) EM signals 101 from the EM channel emulator system 100. The one or more EM SUTs 102 may be configured to generate one or more EM signals 101 and provide the EM signals 101 to the EM channel emulator system 100. For example, the one or more EM SUTs 102 may generate one or more transmitter (TX) EM signals 101 and provide the TX EM signals 101 to the EM channel emulator system 100.

The switch matrix sub-system 104 may be configured to provide the one or more simulation control layers 106 with the ability to co-locate, in real-time, SUTs TX and RX analog signals 101 ingress and egress to the HPC layer 108 independently onto any processing element 116 to allow for continuously optimized placement.

The EM switch matrix sub-system 104 may include two or more layers. For example, the EM switch matrix sub-system 104 may include, but is not limited to, an EM SUT input/output (I/O) layer 110. By way of another example, the EM switch matrix sub-system 104 may include, but is not limited to, a backbone layer 112. By way of another example, the EM switch matrix sub-system 104 may include, but is not limited to, an HPC input/output (I/O) layer 114. By way of another example, the EM switch matrix sub-system 104 may include, but is not limited to, one or more switches 118 arranged between the one or more layers. In one instance, the one or more switches 118 may be arranged between the SUT I/O layer 110 and the backplane layer 112. In another instance, the one or more switches 118 may be arranged between the HPC I/O layer 114 and the backplane layer 112. In another instance, when the sub-system 104 does not include a backplane layer 112, a single switch 118 may be arranged between the SUT I/O layer 110 and the HPC I/O layer 114.

As previously discussed herein, in conventional EM emulator systems, rather than having a switch matrix for optimization and calibration of the system, the conventional systems may be adjusted manually for each scenario to avoid excess "East to West" digital latencies and transfers among processing elements. In this regard, the conventional EM emulator systems have the added complexity of the changing lengths of EM/RF cabling and cable wear that effects propagation loss and emulation integrity for each SUT.

The EM switch matrix sub-system 104 may allow for arbitrary combinations of EM SUTs 102 to be grouped to an individual processing element as their proximity changes in the simulated environment. For example, as discussed further herein, the system 100 may configured to group EM SUTs 102 physically near each other in simulation on the same PE, which optimizes ultra-low latency emulation on the PE and reduces digital EM exchanges between HPC layer processing elements 116.

The high performance computing layer 108 may include any high performance computing device. For example, the high performance computing devices 108 may include one or more general purpose processors (GPPs), Graphics Processing Units (GPUs), application-specific integrated circuits (ASICs), field-programmable gate arrays (FPGAs), digital signal processors (DSPs), or like processors and their supporting equipment.

Figure 2:
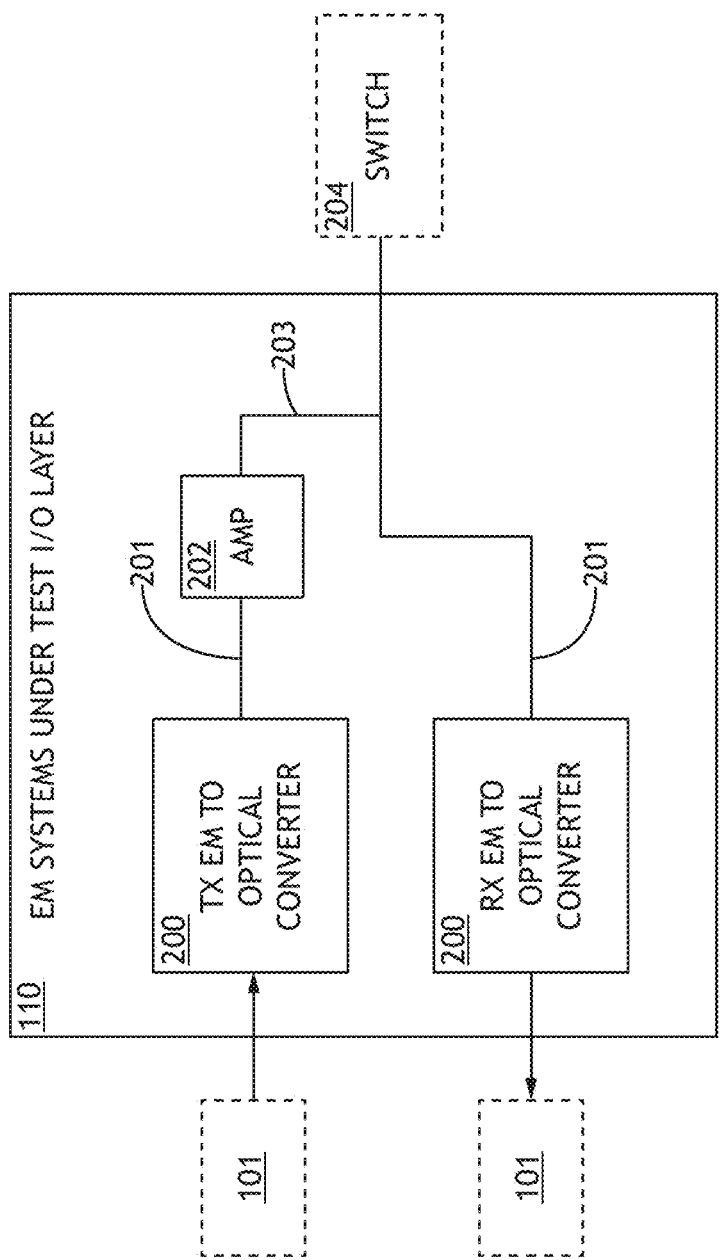
FIG. 2 illustrates a simplified block diagram of an EM systems under test input/output layer of the EM switch matrix sub-system within the EM channel emulator system, in accordance with one or more embodiments of the disclosure.
Figure 3:
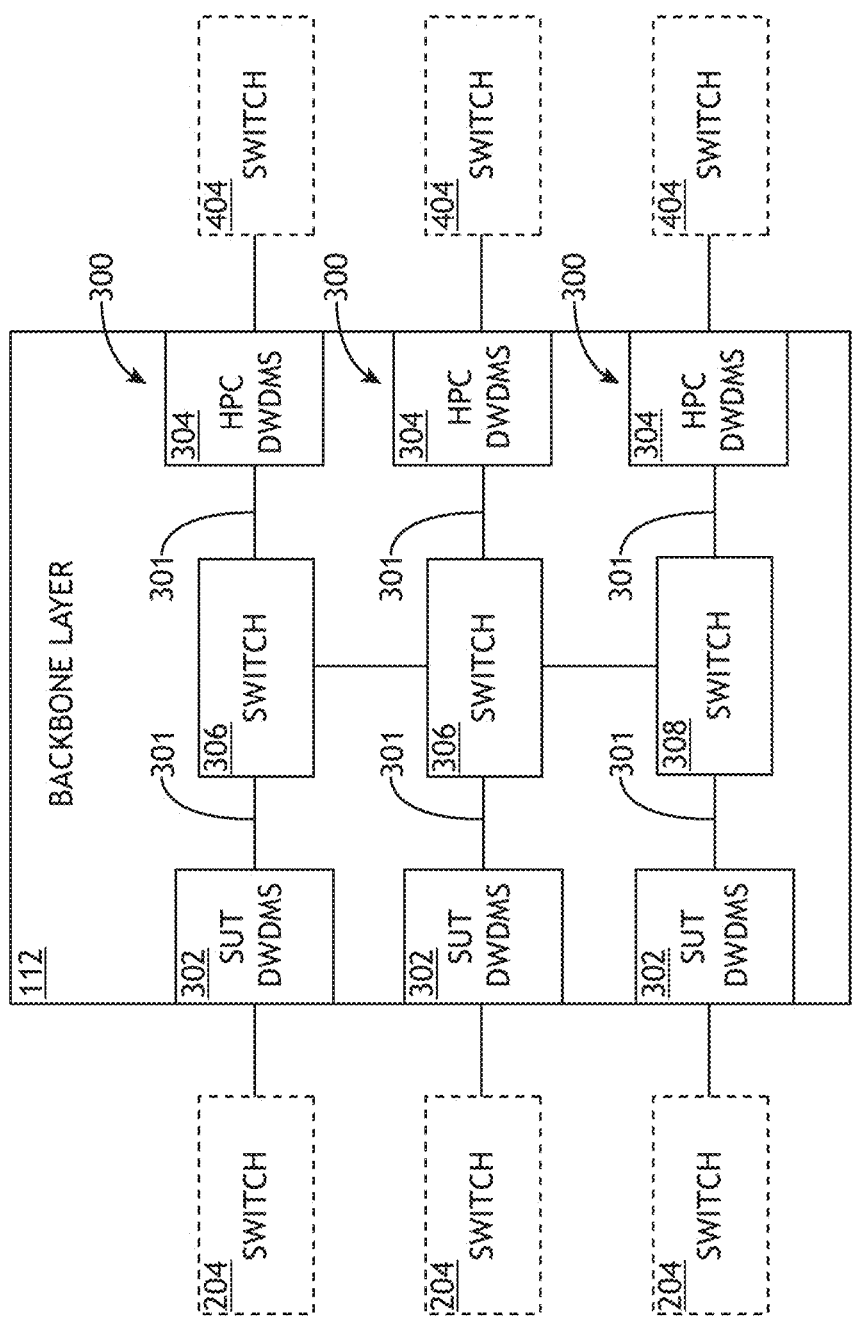
FIG. 3 illustrates a simplified block diagram of a backbone layer of the EM channel emulator system, in accordance with one or more embodiments of the disclosure.
Figure 4:
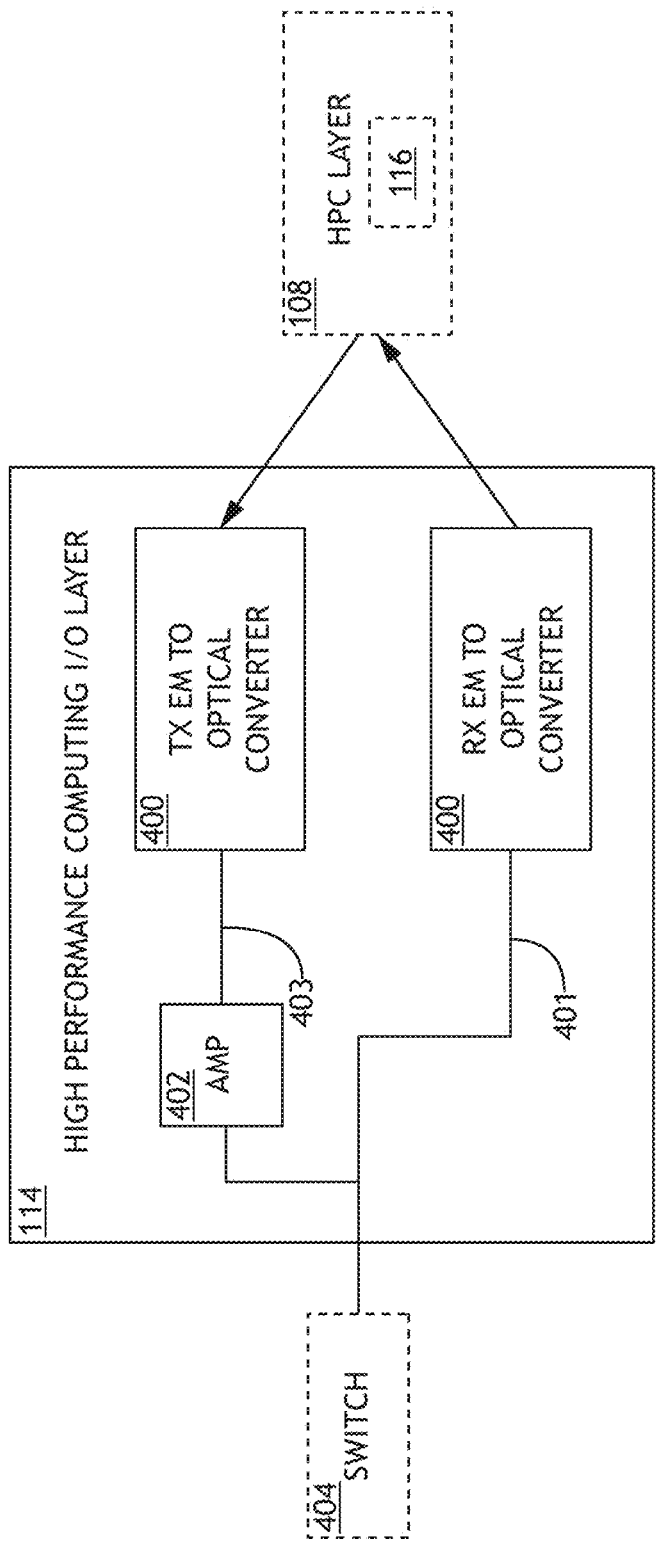
FIG. 4 illustrates a simplified block diagram of a high performance computing input/output layer of the EM switch matrix sub-system within the EM channel emulator system, in accordance with one or more embodiments of the disclosure.
Figure 5:
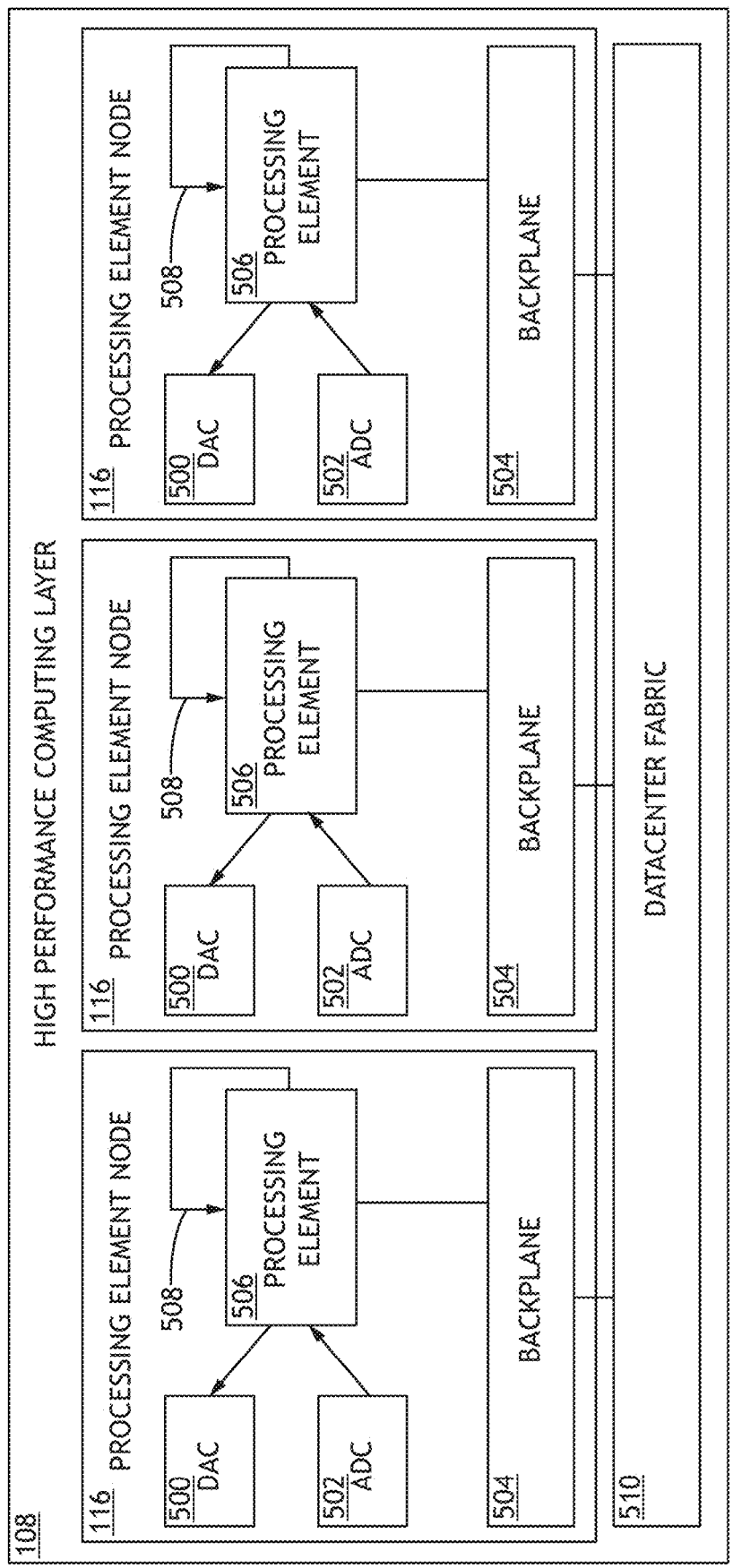
FIG. 5 illustrates a simplified block diagram of a high performance computing layer of the EM channel emulator system, in accordance with one or more embodiments of the disclosure.
Figure 6:
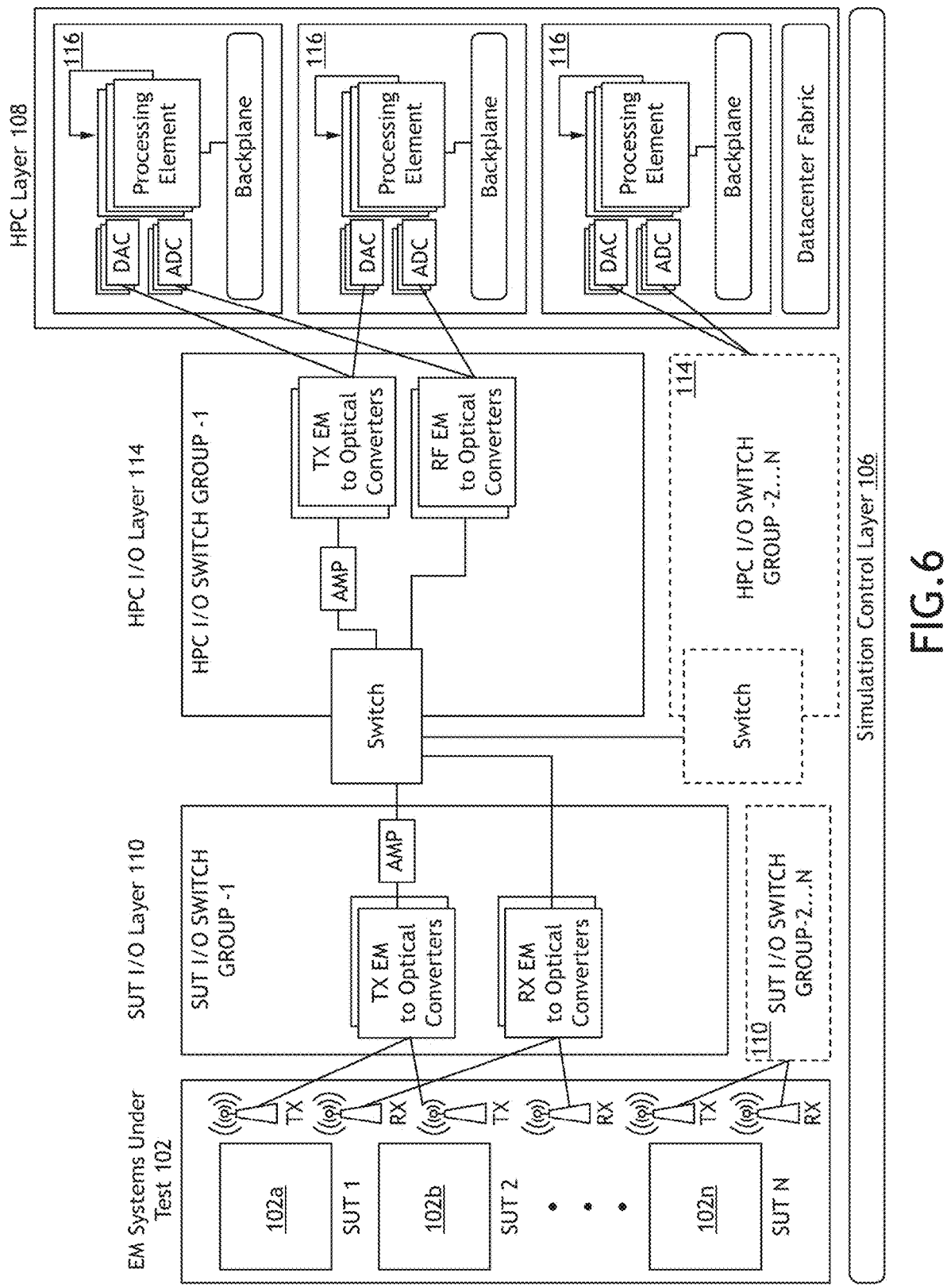
FIG. 6 illustrates a simplified schematic view of an example implementation of the EM channel emulator system in a single switch configuration, in accordance with one or more embodiments of the disclosure.
Figure 7:
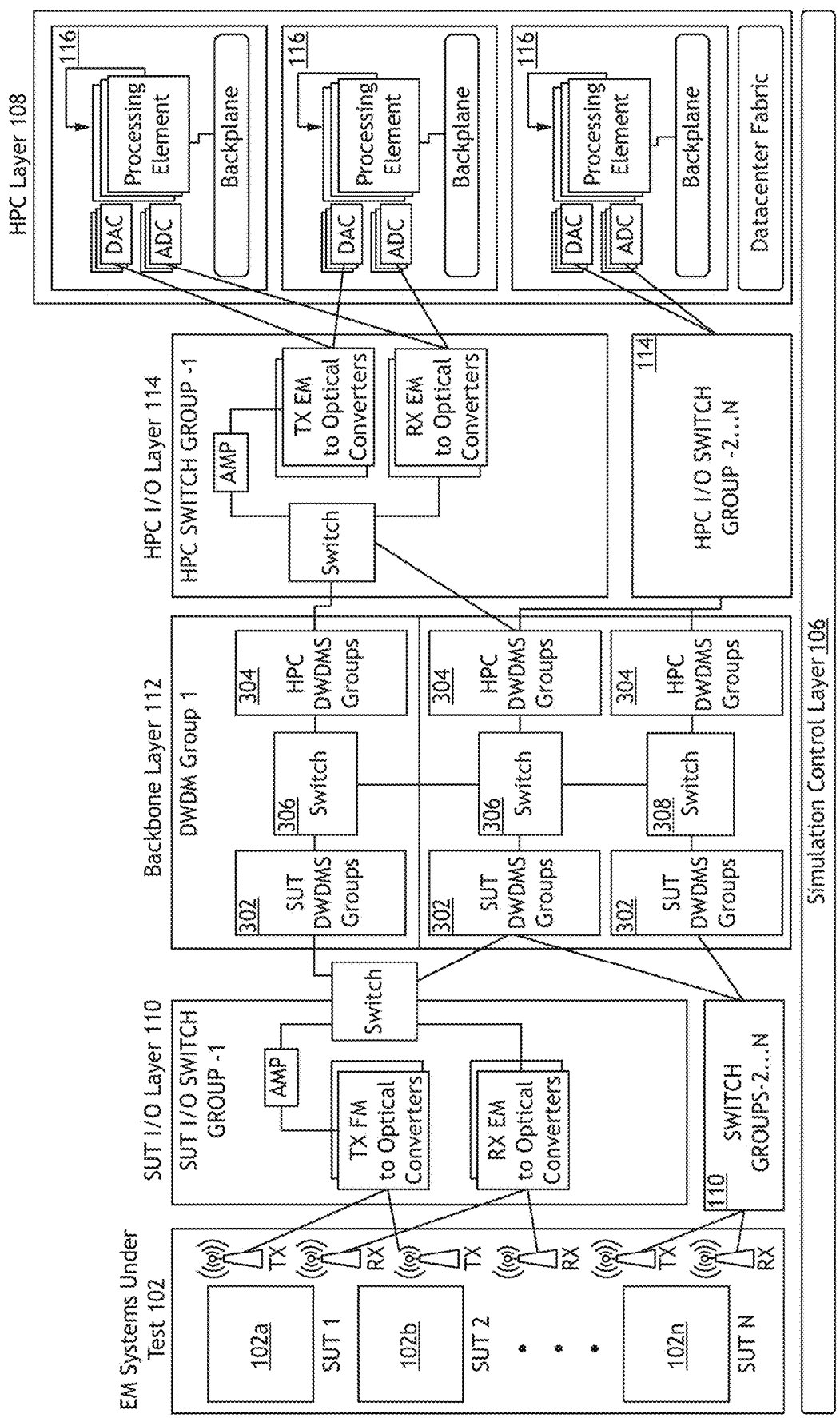
FIG. 7 illustrates a simplified schematic view of an example implementation of the EM channel emulator system with a multi-switch backbone layer, in accordance with one or more embodiments of the disclosure.

FIGS. 2-5 illustrate simplified block diagrams of the one or more layers, in accordance with one or more embodiments of the disclosure. In particular, FIG. 2 illustrates a simplified block diagram of the EM SUT I/O layer 110. In particular, FIG. 3 illustrates a simplified block diagram of the backbone layer 112. In particular, FIG. 4 illustrates a simplified block diagram of the HPC computing layer 114. In particular, FIG. 5 illustrates a simplified block diagram of the processing element nodes 116 of the HPC layer 108. FIG. 6 illustrates a simplified schematic view of an example implementation of the electromagnetic channel emulator system in a single switch configuration, in accordance with one or more embodiments of the disclosure. FIG. 7 illustrates a simplified schematic view of an example implementation of the electromagnetic channel emulator system with a multi-switch backbone layer enabling more systems, in accordance with one or more embodiments of the disclosure.

Referring to FIG. 2, the EM SUT I/O layer 110 may include one or more EM to optical converters 200 configured to receive one or more analog EM signals 101 from the one or more EM SUTs 102 and convert the signals into analog optical signals 201. For example, the EM SUT I/O layer 110 may include a TX EM to optical converter 200 configured to receive signals from the one or more EM SUTs 102 and convert the signals into analog optical signals 201. The EM SUT I/O layer 110 may include one or more EM to optical converters 200 configured to convert optical signals 201 into analog EM signals 101 and provide the signals 101 to the one or more EM SUTs 102. For example, the EM SUT I/O layer 110 may be configured to receive one or more analog optical signals 201 from the switch 204 and the RX EM to optical converter 200 may be configured to converts the signals into analog EM signals 101 and provide the signals 101 to one or more coupled EM SUTs 102.

The EM SUT I/O layer 110 may include an amplifier 202. The amplifier 202 may be configured to receive signals 201 from the TX optical converter 200 and generate one or more amplified signals 203. The EM SUT I/O layer 110 may include any type of amplifier known in the art to correct for signal loss during analog transfer including, but not limited to, Boost Optical Amplifiers (BOAs) and Semiconductor Optical Amplifier (SOA) matching the wavelength of the fiber in the EMSM sub-system 104.

The EM SUT I/O layer 110 may be configured to receive one or more simulation control layer signals 103 from the simulation control layer 106. The one or more simulation control layer signals 103 may be configured to actively control the EM SUT I/O layer 110 to cause the EM SUT I/O layer 110 to provide one of the amplified signals 203 to a switch 204 of the one or more switches 118. For example, the EM switch matrix sub-system 104 may include an optical switch 204 arranged between the SUT I/O layer 110 and an adjacent layer (e.g., a backbone layer 112 or a switch 404 shared with the HPC I/O layer 114). For instance, the optical switch may include any type of switch including, but not limited to, a 96×96 MEMs optical switch. Once the analog EM signal is converted to an analog optical signal 201 and amplified via the amplifier 202, the amplified optical signal 203 is passed to the switch 204 which is actively controlled by the simulation control layer 106.

The switch 204 of the one or more switches 118 may be configured to provide the signal to the backbone layer 112 or to the HPC I/O layer 114 based on received simulation control layer signals 103 from the simulation control layer 106.

Referring to FIG. 3, the backbone layer 112 may be configured to provide scalability to the EM switch matrix sub-system 104 allowing analog signals routed to expand beyond single switch capacities. It is noted that the backbone layer 112 may be optional for small emulator systems capable of fitting all SUT TX/RX ports on a single shared switch (e.g., less than 96 TX/RX ports) between the I/O layers 110, 114

The backbone layer 112 may include one or more backbone nodes 300. Each backbone node 300 may include, but is not limited to, one or more SUT DWDMs 302, one or more HPC DWDMs 304, one or more switches 306, and the like. The backbone layer 112 may be configured to package together the one or more signals on a single fiber and route those packaged signals based on the determined correct path from the simulation control layer 106. For example, the backbone layer 112 may include one or more dense wavelength division multiplexing (DWDM) (and demultiplexing) mechanisms. The one or more DWDM mechanisms may include one or more SUT DWDMs 302 and one or more HPC DWDMs 304. The DWDMs 302, 304 may include one or more multiplexers (MUXs) and demultiplexers (DE-MUX) to encode one or more inputs and package the inputs onto a single fiber line, and vice versa using the wide bandwidth of optical fibers. For example, the DWDMs 302, 304 may include one or more 16:1 MUXs/DEMUXs, where each 16:1 MUX includes 16 input lines, one encoded output line and each 1:16 DEMUX includes 1 encoded input line and 16 output lines. By way of another example, the one or more DWDMs 302, 304 may include one or more 8:1 MUX/DEMUXs, where each 8:1 MUX includes eight input lines, one encoded output line. It is noted that the backbone layer 112 may include any suitable technologies known in the art to increase signal to fiber density. Therefore, the above description should not be construed as limiting the scope of the present disclosure.

It is noted that the backbone layer 112 and I/O layers 110, 114 of the EMSM sub-system 104 may be configured to operate in a similar manner as a postal service system. For example, the I/O layer switches 204, 404 may be configured to act as delivery people responsible for individual destination delivery and sending. The backbone layer 112 may be configured to act as a inter-post office service, the DWDM 302 and other technologies may be configured to package all signals bound for different "zip codes" and transport them across the one or more backbone switches 306 (e.g., "long haul trucks") as packs of signals to be unpackaged (demuxed) at the appropriate "zip code" of the destination. The DWDM 304 (e.g., "post office") may be configured to be turned over to the HPC I/O layer switch 404 post man.

The backbone layer 112 may include one or more backbone switches 306 configured to receive the package of signals from the DWDM mechanisms and provide the packed signals to one of one or more HPC DEMUXs or an additional backbone switch 306 for a more distant DWDM grouping.

In a non-limiting example, the backbone layer 112 may include a DWDM MUX to package 16×1550 nm inputs and space them out 200 GHz apart on a single fiber. This pack of signals 301 is then sent with all other SUT I/O layer multiplexed fibers to a backbone matrix switch 306. At the switch, it is sent to one or more HPC demuxers 304 facing the HPC 10 layer 114 or to an additional backbone switch 308 connected to its pack's destination. Once at its destination the signal is handled by the I/O layer switches (204, 404) for individual path selection.

The inter-backbone node fiber connection consists of half of the backbone switches capability. One quarter of the fibers connect TX/RX to the next node and the other quarter connect to the previous node. If no further backbone nodes exist next fibers are looped back to the first node. Each added backbone node 300 linearly adds to the capacity of the EMSM sub-system 104 capable of moving the entire packed signal contents to other nodes. Once the pack of signals are received at the appropriate backbone node it is sent to be demuxed to individual signals and passed to the HPC I/O layer switch 404.

Referring to FIG. 4, in some embodiments, the HPC I/O layer 114 may include a HPC I/O switch 404 of the one or more switches 118. For example, the HPC I/O layer 114 may include an optical switch. For instance, the HPC I/O layer 114 may include a 96×96 MEMs optical switch.

The HPC I/O layer 114 may be configured to receive one or more optical EM signals from the backbone layer HPC DWDM 304 and provide the signals to its connected switch 404.

The HPC I/O layer 114 may include one or more EM converters 400. For example, the unpacked outbound optical EM signals may be provided to the HPC I/O switch 404 to be individually placed within the fiber to one or more RX EM converters 400.

The HPC I/O layer 114 may include an amplifier 402. The amplifier 402 may be configured to receive signals from the TX optical converter 400 and the HPC layer 106 and generate amplified signals 403. The HPC I/O layer 114 may include any type of amplifier known in the art including, but not limited to, Boost Optical Amplifiers (BOAs) and Semiconductor Optical Amplifier (SOA) in matching fiber wavelength that in the EMSM.

Referring to FIG. 5, within the HPC layer 108 not all East to West traffic has the same impact. It is noted that the switch matrix sub-system 104 is configured to balance analog signal distribution, while prioritizing data flow based on the latency and bandwidth limitations of various east to west traffic options (e.g., within a processing element 506, direct processing element to processing element 508, backplane 504, data center fabric 510, or the like). In this regard, the EM switch matrix sub-system 104 may be configured to use the placement of the signal to keep all processing (e.g., calculations) done within a specific component of the HPC layer 108 (e.g., the processing element 506 or directly connected processing elements available utilizing 508, 504, 510) to avoid shared resource use, guarantee time critical processing, select optimal digital transfer mechanisms, and minimize amount of transfers among processing elements 506 which limits scalability.

The HPC layer 108 may include one or more processing element nodes 116 including, but not limited to, one or more analog to digital converters (ADC) 500, one or more digital to analog converters (DAC) 502, one or more processing elements 506, backplane 504, and data center fabric 510.

The one or more ADCs 502 in the processing element node 116 may be configured to receive the resulting analog EM signals from the one or more EM converters 400.

The simulation control layer 106 may be configured to provide the aggregate strength loss, delay, and other effects the signal experiences when traversing the EMSM sub-system 104 to the one or more processing elements 506. Once the one or more processing elements 506 have performed channel emulation signal processing in the optimal processing element(s) with necessary other SUT signals at hand, the resulting signal may be sent out through to the one or more DACs 502 as directed by the simulation control layer 106. The one or more DACs 502 may be connected to a TX to optical converter 400 connected to a correctly switched egress fiber to provide the signal through the EMSM sub-system 104 in the reverse. For example, the signal may be routed back to the receiver of the SUT through the EMSM sub-system 104.

It is noted that signal distribution within a processing element may have the lowest latency and highest data throughput possible with multiple signals being processed digitally within a single processing element. Further, it is noted that signal distribution Chip to Chip (C2C) 508 may have high speed low latency interfaces only able to connect like processing elements at short range. These connections may have lower latency and higher bandwidth than backplane connections. Further, it is noted that signal distribution to the backplane 504 (e.g., a common connection between many processing elements within a single HPC unit.) may have a higher latency and lower data throughput than the C2C. Further, it is noted that signal distribution to the Datacenter Fabric 510 (e.g., a common connection between HPC backplanes) may have longer range technologies capable of communication within and outside of the HPCs datacenter. As the EM Channel Emulator individual PEs are saturated to capacity the EMSM sub-system 104 may be configured to select PE choices based on these characteristics of the interfaces to transfer and fulfill the simulation's emulated signal processing.

Figure 8:
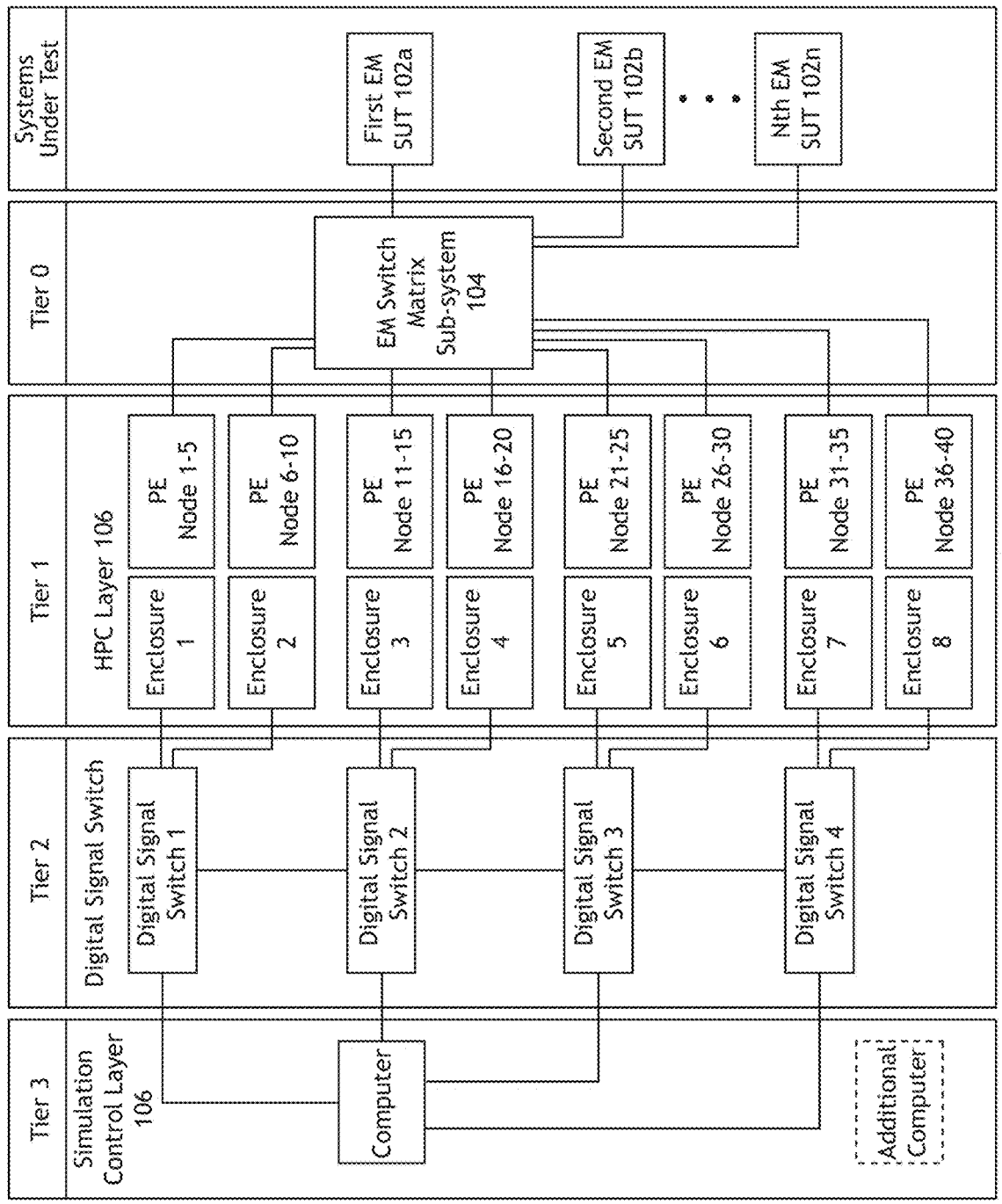
FIG. 8 illustrates a simplified block diagram view of an example implementation of the large scale electromagnetic channel emulator system with an EM switch matrix sub-system, in accordance with one or more embodiments of the disclosure.

Referring to FIG. 8, the tier system depicted in FIG. 8 illustrates an example EM Channel emulator system separated out into increasing tiers of latency and processing that the EMSM sub-system 104 optimizes within a datacenter sized system. It is noted that maximizing Tier 0 processing the least with analog effects with the lowest possible latency and processing cost minimizing the digital transfers between processing element nodes and costly inter-tier transactions necessary to reach between enclosures.

FIGS. 9-13 illustrate various example functional use cases, in accordance with one or more embodiments of the disclosure. Each of these functional use cases illustrates in a non-limiting examples how the EMSM intelligently shifts analog signal egress and ingress based upon EM channel emulator conditions.

Figure 9:
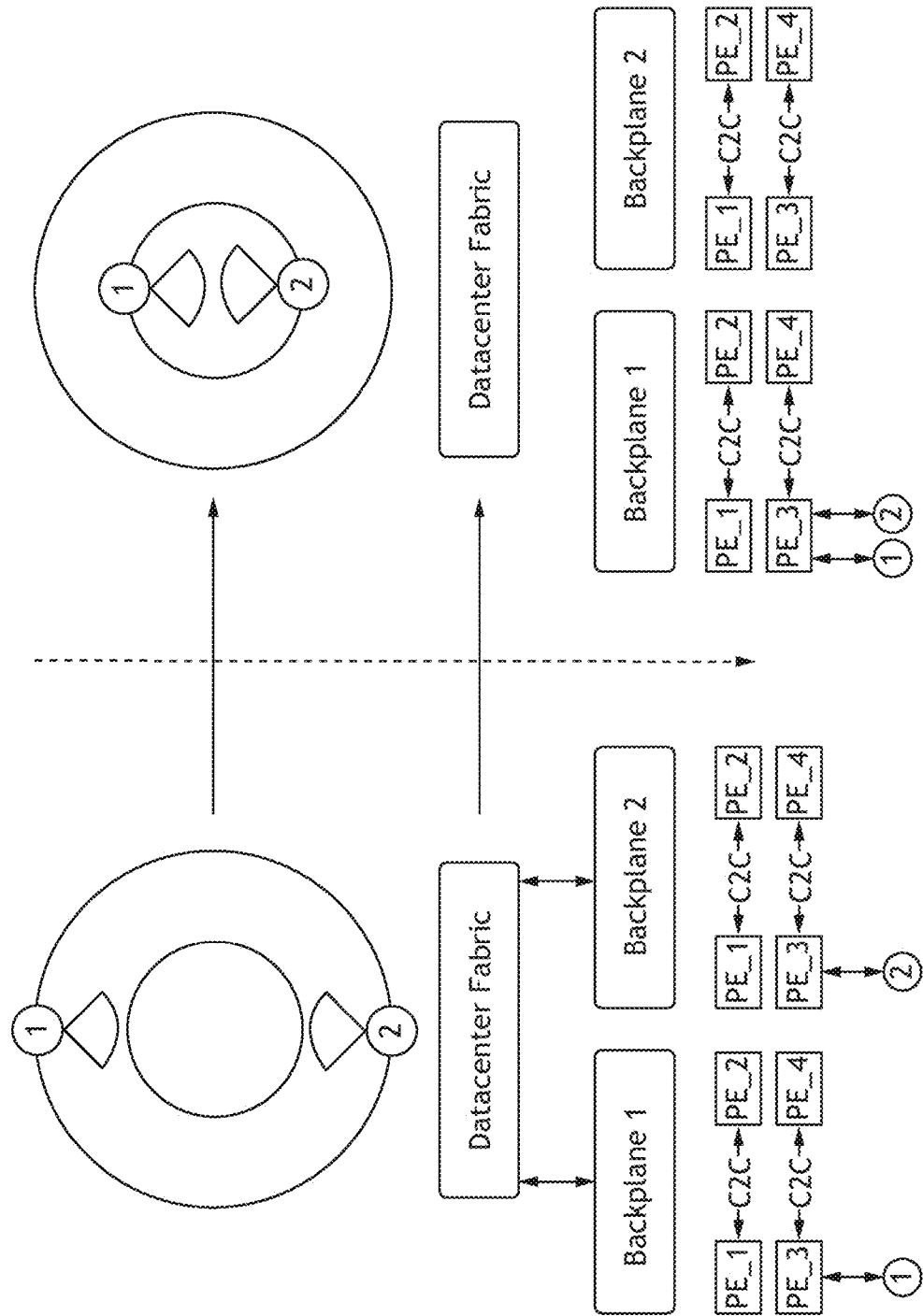
FIG. 9 illustrates an example functional use case, in accordance with one or more embodiments of the disclosure.

Referring to FIG. 9, the EM channel emulator system 100 may be configured to provide platform mobility and low latency optimization. In a non-limiting example, before starting an example scenario, a first SUT (e.g., SUT #1) and a second SUT (e.g., SUT #2) may be on processing elements on different backplanes and exchange data through the datacenter fabric. Continuing with this example, during the simulation the two SUTs (e.g., SUT #1 and SUT #2) may move closer together in the simulated "holodeck". Their limited simulation distance requires low latency processing to get the signal to the other SUT in time. It is noted that SUT #1 and SUT #2 must have their EM signals on the same PE in order to meet this free-space propagation driven low latency timing requirement. In this regard, the simulation control layer 106 may be configured to generate one or more control signals 103 to cause the EM switch matrix sub-system 104 to switch the second SUT (e.g., SUT #2) to the same processing element (e.g., PE_3) as the first SUT (e.g., SUT #1) as the SUTs move closer together predictively.

Figure 10:
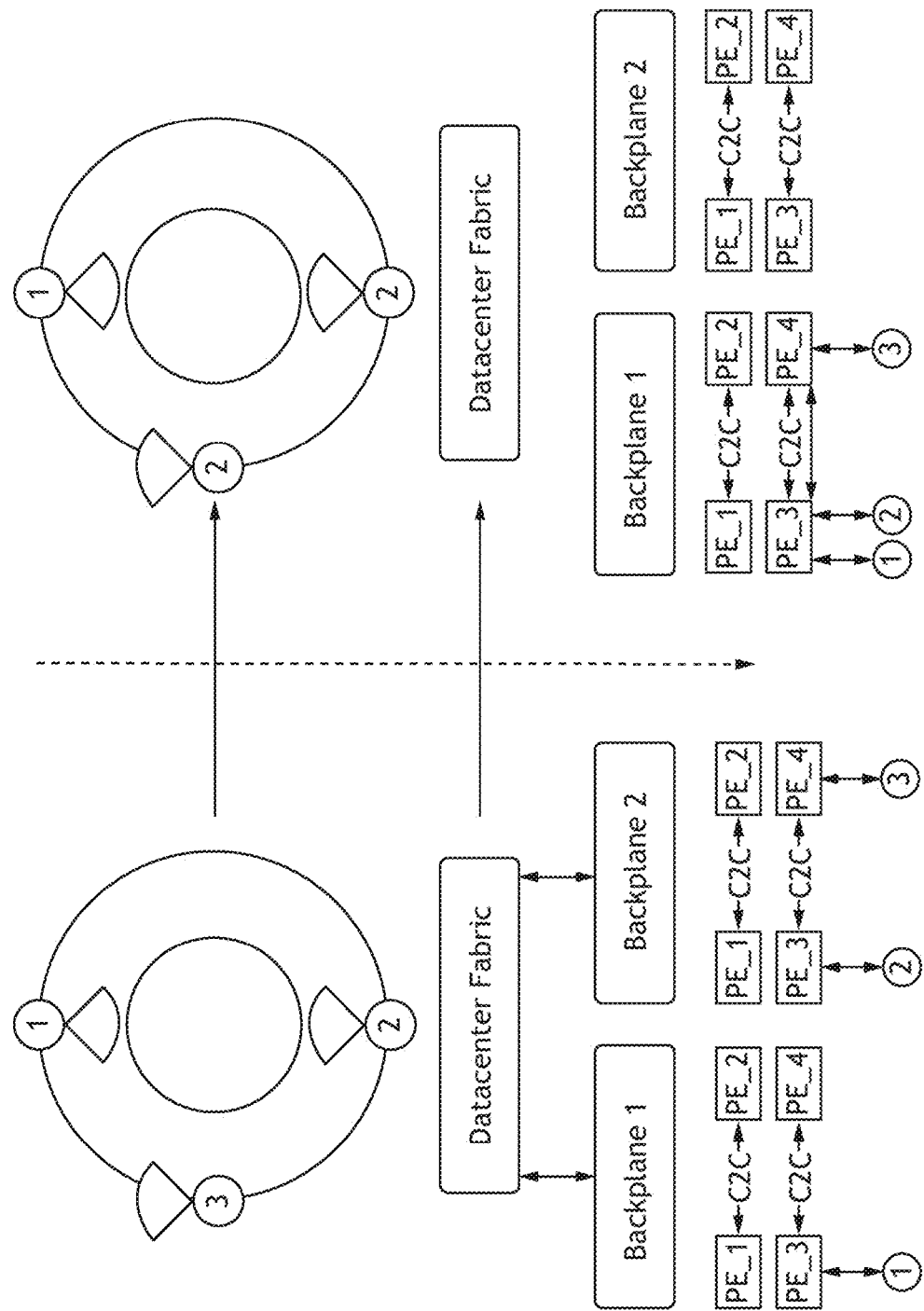
FIG. 10 illustrates an example functional use case, in accordance with one or more embodiments of the disclosure.

Referring to FIG. 10, the EM channel emulator system 100 may be configured to solely optimize digital transfers. In a non-limiting example, the one or more SUTs (e.g., SUT #1, SUT #2, SUT #3) may be positioned on processing elements on different backplanes (e.g., Backplane 1 and Backplane 2). Continuing with this example, during simulation, the EM switch matrix sub-system 104 may be configured to initialize a transfer to reduce the latency and traffic on the Datacenter Fabric and the Backplane. For instance, the EM switch matrix sub-system 104 may be configured to switch the signals of SUT #2 to PE_3 and since SUT #3 will not fit on PE_3's, the switch may move it to the adjacent PE connected via C2C 508 (e.g., PE_4). It is noted that this eliminates digital transfers on all resources besides the C2C 508 between PE_3 and PE_4.

Figure 11:
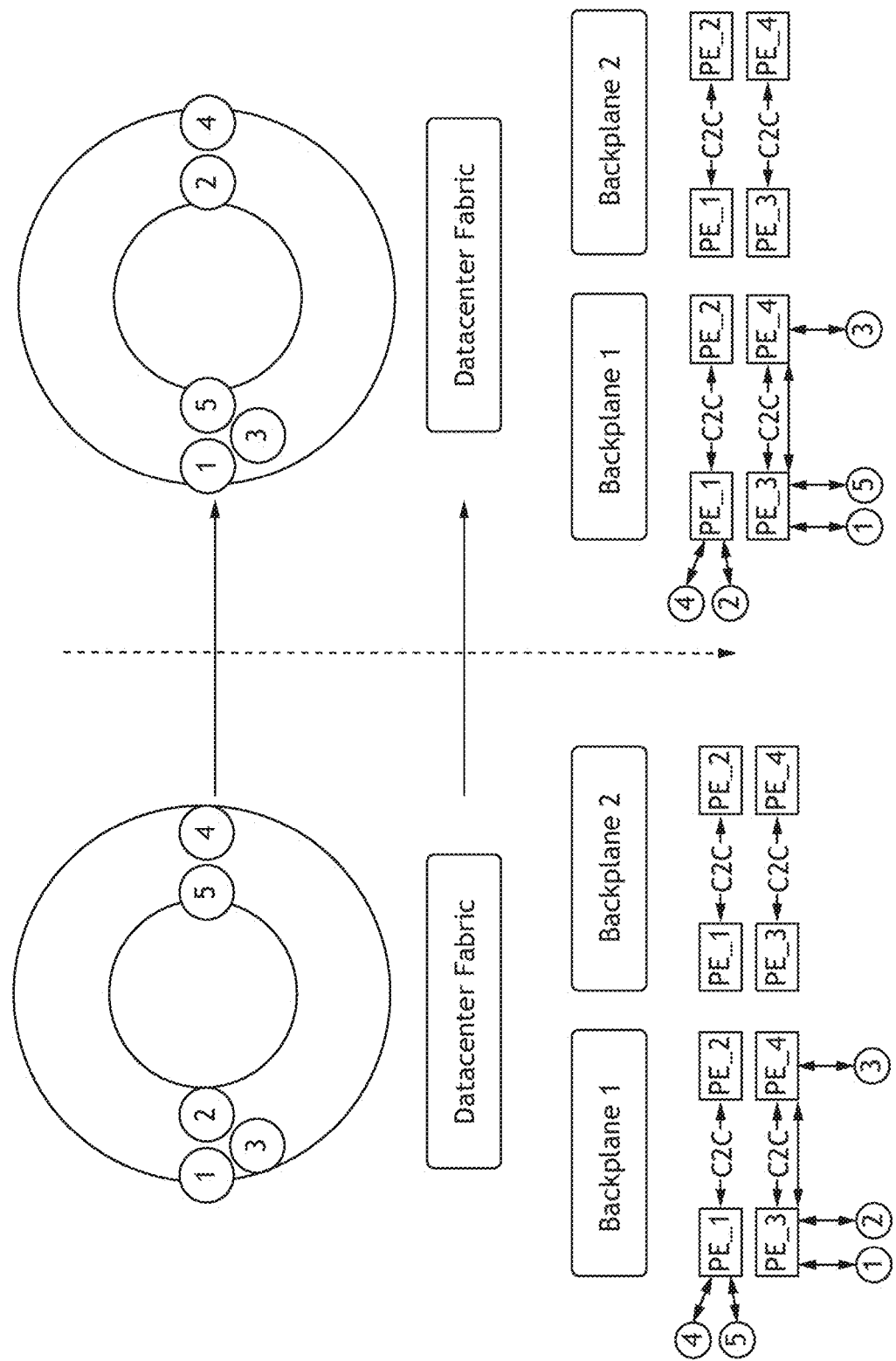
FIG. 11 illustrates an example functional use case, in accordance with one or more embodiments of the disclosure.

Referring to FIG. 11, the EM channel emulator system 100 may be configured to perform a simulation of dynamic grouping of the SUTs by changing optimal distribution. In a non-limiting example, during an initial period, a first group may include a first set of SUTs (e.g., SUT #1, SUT #2, SUT

3) and a second group may include an additional set of SUTs (e.g., SUT #4, SUT #5). Continuing with this example, during simulation, the EM channel emulator system 100 may be configured to cause an SUT of the second group (e.g., SUT #5) to swap simulated positions with an additional SUT of the first group (e.g., SUT 2). The EM switch matrix sub-system 104 may then swap processing elements of the SUTs as the SUTs swap groups to ensure low latency processing between SUT #4, #5 and SUT #1, #2, #3 can occur and to keep digital transfers to a minimum.

Figure 12:
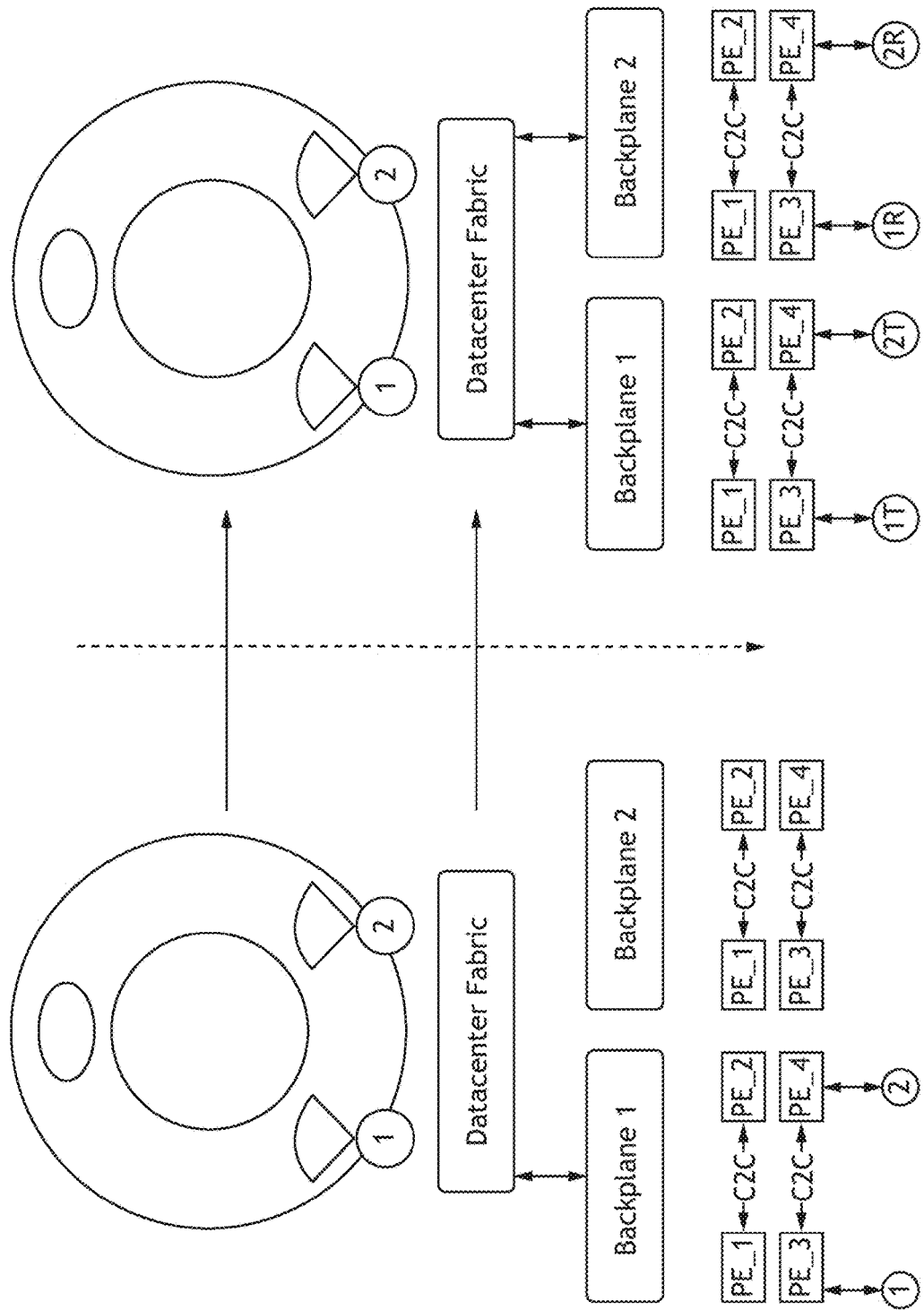
FIG. 12 illustrates an example functional use case, in accordance with one or more embodiments of the disclosure.

Referring to FIG. 12, the EM channel emulator system 100 may be configured to add latency through digital transfer. It is noted that when the distance between the transmitter and the ultimate receipt of the signal gets large within the simulation, the memory capacity to store the signal in transit can limit what the EM channel emulator system 100 can process. In this regard, in a non-limiting example, the EM switch matrix sub-system 104 may be configured to split apart the two radar systems into transmit (TX) and receive (RX) to allow the latency of the east to west transfer of their digital signals to help emulate the radar bouncing off an object. In this non-limiting example, the added 1050 ns of time by transit delay saves 294 kbps per each path of emulated signal propagation, of which there may be thousands or larger dependent on simulation fidelity, between the systems under test not having to be buffered by a PE in memory.

Figure 13:
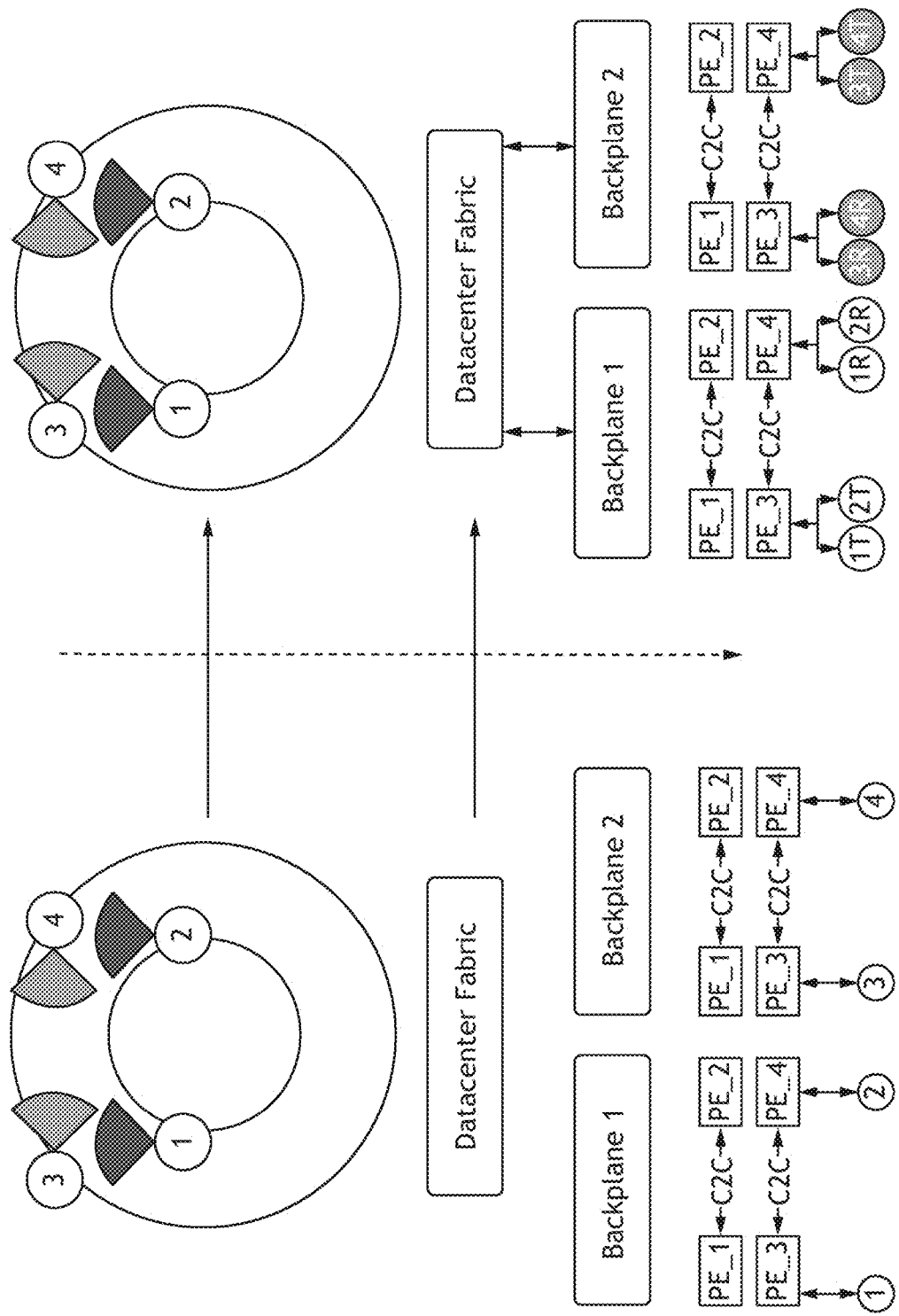
FIG. 13 illustrates an example functional use case, in accordance with one or more embodiments of the disclosure.

Referring to FIG. 13, the EM channel emulator system 100 may be configured to group by EM characteristics. The EM switch matrix sub-system 104 may be configured to group the transmissions together on processing elements that will interact with the other SUTs signals based upon their EM signals in the emulated space. For instance, receiving channels may be independently grouped together depending on the SUTs frequency at that moment in the simulation. In a non-limiting example, a first SUT (e.g., SUT #1) and an additional SUT (e.g., SUT #3) may not interact with each other due to frequency range in use being widely separated. In this regard, the EM switch matrix sub-system 104 may be configured to group SUT #1 and SUT #3 together and SUT #2 and SUT #4 together based on the EM characteristics of the one or more SUTs. It further may group their receive and transmits independently, SUT #1 becomes 1R and 1T for receive and transmit respectively, to localize processing of transmit/receive effects processing.

It is noted that FIGS. 9-13 are provided merely for illustrative purposes and shall not be construed as limiting the scope of the present disclosure. The EM switch matrix sub-system 104 may be implemented in additional ways.

For example, the EM switch matrix sub-system 104 may be used to perform multiple simulations. For instance, the simulation control layer 106 may be configured to allocate PEs and the SUTs to different test scenarios running concurrently. It is noted that the scenarios allocated resources may be optimized independently and the EM switch matrix sub-system 104 may be used to shift the SUTs to the correct PEs assigned to the scenario the SUT scheduled to perform.

By way of another example, the EM switch matrix sub-system 104 may be configured to enable the 24/7/365 utilization of the system, without the need for days calibration-related down time for large scale systems. Due to temperature and component aging, an online calibration procedure is essential to maintain synchronization for the duration of a simulation. It is noted that various test equipment including, but not limited to, signal generators, signal analyzers, and the like may be connected alongside the SUTs to the EMSM ports. In this regard, the simulation control layer may be configured to switch these test signals to the PE due for calibration with other PEs remaining available.

By way of another example, in the case of ultra-short range effects, the EM switch matrix sub-system 104 may be used to incorporate analog effects in place of the HPC layer. In the HPC I/O layer, effects such as optical delay lines, noise, splitter/attenuator matrixes, or the like are added. The resulting signals are looped back into the switch matrix sub-system and the switch matrix sub-system may then switch the signal to the appropriate effect based on the simulated position and the best effect matching the scenario's current state. The shortest range the system can emulate then becomes the delay of EM signal conversion to optical analog and time to traverse the path and be switched back to the SUT (within nanoseconds).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, comprising:
   one or more electromagnetic systems under test;
   one or more simulation control layers, the one or more simulation control layers configured to perform one or more simulations of the one or more electromagnetic systems under test within an emulated electromagnetic environment, the one or more simulation control layers configured to generate one or more simulation control layer signals based on the performed one or more simulations; and
   an electromagnetic channel emulator sub-system, the electromagnetic channel emulator sub-system comprising:
      an electromagnetic switch matrix sub-system, the electromagnetic switch matrix sub-system communicatively coupled to the one or more electromagnetic systems under test and the one or more simulation control layers, the electromagnetic switch matrix sub-system configured to receive the one or more simulation control layer signals from the one or more simulation control layers;
      a backbone layer, the backbone layer including one or more backbone nodes, the one or more backbone nodes comprising:
         one or more multiplexing and demultiplexing mechanisms; and
         one or more backbone layer switches,
         the one or more multiplexing and demultiplexing mechanisms configured to package the one or more analog optical signals into a single packaged signal carrier and provide the single packaged signal carrier to the one or more backbone switches, the one or more multiplexing and demultiplexing mechanisms configured to unpackage the single packaged signal carrier and provide the unpackaged signal carrier to the one or more switches of the electromagnetic switch matrix sub-system; and a high performance computing layer including one or more processing element nodes, the high performance computing layer communicatively coupled to the electromagnetic switch matrix sub-system and the one or more simulation control layers, the high performance computing layer configured to receive the one or more simulation control layer control signals from the one or more simulation control layers, the electromagnetic switch matrix sub-system comprising:

one or more input/output layers, the one or more input/output layers including one or more electromagnetic systems under test input/output layers and one or more high performance computing input/output layers, the one or more input/output layers including one or more signal converters configured to convert one of one or more analog electromagnetic signals into one or more converted optical analog signals or one or more optical analog signals into one or more converted analog electromagnetic signals; and one or more switches, the one or more switches communicatively coupled to the one or more input/output layers and the high performance computing layer, the one or more switches configured to selectively position a path of an analog electromagnetic signal of the one or more analog electromagnetic signals based on the received one or more simulation control layer signals, the path of the analog electromagnetic signal of the one or more analog electromagnetic signals including one of an inbound path to a processing element node or an outbound path from a processing element node.

2. The system of claim 1, wherein the one or more switches include a first set of one or more switches positioned between the one or more electromagnetic systems under test input/output layers and the backbone layer and an additional set of one or more switches positioned between the backbone layer and the one or more high performance computing input/output layers.

3. The system of claim 2, wherein the one or more simulation control layers are configured to cause the one or more switches to selectively position the one or more analog optical signals within the backbone layer based on the received one or more simulation control layer signals.

4. The system of claim 1, wherein the one or more switches are positioned between the one or more electromagnetic systems under test input/output layers and the one or more high performance computing input/output layers.

5. The system of claim 4, wherein the one or more simulation control layers are configured to cause the one or more switches to selectively position the one or more analog electromagnetic signals within a processing element node of the one or more processing element nodes of the high performance computing input/output layer based on the received one or more simulation control layer signals.

6. The system of claim 1, wherein the one or more electromagnetic systems under test include a first electromagnetic system under test and a second electromagnetic system under test, the first electromagnetic system under test being on a first processing element and the second electromagnetic system under test being on a second processing element, the first processing element being different than the second processing element, the one or more electromagnetic systems under test configured to move closer together to cause the one or more simulation control layers to generate one or more simulation control layer signals to cause the one or more switches to move the first electromagnetic system under test and the second electromagnetic system under test onto the same processing element.

7. The system of claim 1, wherein the one or more simulation control layers are configured to generate one or more simulation control signals to cause the one or more switches to co-locate the one or more electromagnetic systems under test by moving a first electromagnetic system under test and a second electromagnetic system under test onto a first processing element and a third electromagnetic system under test onto a second processing element, the first processing element positioned adjacent to the second processing element.

8. The system of claim 1, wherein the one or more electromagnetic systems under test include a first group of one or more electromagnetic systems under test and an additional group of one or more electromagnetic systems under test, the one or more electromagnetic systems under test of the first group positioned in close proximity to each other, the one or more electromagnetic systems under test of the additional group positioned in close proximity to each other, the one or more simulation control layers configured to generate one or more simulation control to cause the one or more switches to adjust the first group and the additional group by swapping a first system under test of the first group with a second system under test of the additional group.

9. The system of claim 1, wherein the one or more electromagnetic systems under test are configured to one of transmit one or more signals or receive one or more signals, the one or more simulation control layers configured to generate one or more simulation control layer signals to cause the one or more switches to split one or more receive signals and one or more transmit signals by placing the one or more receive signals on a first backplane and by placing the one or more transmit signals on an additional backplane, the first backplane having a longer digital transfer than the additional backplane.

10. The system of claim 1, wherein the one or more electromagnetic systems under test include a first set of one or more electromagnetic systems under test and an additional set of one or more electromagnetic systems under test, the first set of one or more electromagnetic systems under test having one or more first electromagnetic signal characteristics and the second set of one or more electromagnetic systems under test having one or more additional electromagnetic signal characteristics, the one or more first electromagnetic signal characteristics being different than the one or more additional electromagnetic signal characteristics, the one or more simulation control layers configured to generate one or more simulation control layer signals to cause the one or more switches to place the first set of one or more electromagnetic systems under test on a first backplane processing element and the additional set of one or more electromagnetic systems under test on an additional backplane processing element, the first set of one or more electromagnetic systems under test configured to not interact with the additional set of one or more electromagnetic systems under test.

11. An electromagnetic channel emulator system comprising:
an electromagnetic switch matrix sub-system, the electromagnetic switch matrix sub-system communicatively coupled to one or more electromagnetic systems under test and the one or more simulation control layers, the electromagnetic switch matrix sub-system configured to receive the one or more simulation control layer signals from the one or more simulation control layers;
a backbone layer, the backbone layer including one or more backbone nodes, the one or more backbone nodes comprising:
one or more multiplexing and demultiplexing mechanisms; and
one or more backbone layer switches,
the one or more multiplexing and demultiplexing mechanisms configured to package the one or more analog optical signals into a single packaged signal carrier and provide the signal packaged signal carrier to the one or more backbone switches, the one or more multiplexing and demultiplexing mechanisms configured to unpackage the single packaged signal carrier and provide the unpackaged signal carrier to the one or more switches of the electromagnetic switch matrix sub-system; and
a high performance computing layer including one or more processing element nodes, the high performance computing layer communicatively coupled to the electromagnetic switch matrix sub-system and the one or more simulation control layers, the high performance computing layer configured to receive the one or more simulation control layer signals from the one or more simulation control layers,
the electromagnetic switch matrix sub-system comprising:
one or more input/output layers, the one or more input/output layers including one or more electromagnetic systems under test input/output layers and one or more high performance computing input/output layers, the one or more input/output layers including one or more signal converters configured to convert one of one or more analog electromagnetic signals into one or more converted optical analog signals or one or more optical analog signals into one or more converted analog electromagnetic signals; and
one or more switches, the one or more switches communicatively coupled to the one or more input/output layers and the high performance computing layer, the one or more switches configured to selectively position a path of an analog electromagnetic signal of the one or more analog electromagnetic signals based on the received one or more simulation control layer signals, the path of the analog electromagnetic signal of the one or more analog electromagnetic signals including one of an inbound path to a processing element node or an outbound path from a processing element node.

12. The system of claim 2, wherein the one or more switches include a first set of one or more switches positioned between the one or more electromagnetic systems under test input/output layers and the backbone layer and an additional set of one or more switches positioned between the backbone layer and the one or more high performance computing input/output layers.

13. The system of claim 11, wherein the one or more switches are positioned between the one or more electromagnetic systems under test input/output layers and the one or more high performance computing input/output layers.

* * * * *